United States Patent
Holden et al.

[11] Patent Number: 6,112,065
[45] Date of Patent: Aug. 29, 2000

[54] LOW TO HIGHER IF CONVERSION FOR ACTIVE FILTERED LIMITED IF SYSTEMS

[75] Inventors: Alan R. Holden, Apex; Antonio Montalvo, Raleigh, both of N.C.

[73] Assignee: Ericsson Inc., Research Triangle Park, N.C.

[21] Appl. No.: 08/970,422

[22] Filed: Nov. 14, 1997

[51] Int. Cl.$^7$ ............................................. H04B 1/26
[52] U.S. Cl. .................. 455/207; 455/314; 455/308
[58] Field of Search ..................... 455/226.2, 315, 455/326, 308, 311, 313, 334, 339, 314, 207, 205, 323, 296; 375/346, 350, 351

[56] References Cited

U.S. PATENT DOCUMENTS

| | | | |
|---|---|---|---|
| 3,544,899 | 12/1970 | Gusyatinsky et al. | 455/207 |
| 4,476,586 | 10/1984 | Ishida | 455/207 |
| 4,580,289 | 4/1986 | Enderby | 455/314 |
| 4,852,123 | 7/1989 | Bickley et al. | 357/9 |
| 5,193,210 | 3/1993 | Nicholas et al. | 455/38.1 |
| 5,404,589 | 4/1995 | Bjiker et al. | 455/200.1 |
| 5,548,831 | 8/1996 | Bjiker et al. | 455/207 |
| 5,696,792 | 12/1997 | Sudo et al. | 375/279 |
| 5,852,772 | 12/1998 | Moore et al. | 455/313 |
| 5,875,390 | 2/1999 | Brehmer et al. | 455/226.2 |
| 5,917,315 | 6/1999 | Weckstrom | 324/76.23 |
| 6,035,186 | 12/1998 | Moore et al. | 455/313 |

FOREIGN PATENT DOCUMENTS

| | | |
|---|---|---|
| WO97/06604 | 2/1997 | WIPO . |
| WO98/37629 | 8/1998 | WIPO . |

OTHER PUBLICATIONS

"The Design of High Dynamic Range Continuous–Time Integratable Bandpass Filters", Gert Groenewold, IEEE Transactions on Circuits and Systems, vol. 38, No. 8, Aug. 1991.

Primary Examiner—Dwayne D. Bost
Assistant Examiner—Joy Redmon
Attorney, Agent, or Firm—Burns, Doane, Swecker & Mathis, L.L.P.

[57] ABSTRACT

An improved receiver architecture utilizing active filters for frequency conversion, wherein the final IF stage operates at a frequency higher than the previous IF stage, is disclosed to facilitate the processing by a baseband system operating at higher IF of signals from receivers operating at lower IFs and to enable the continued use of existing post-IF devices with multiple-conversion receivers. A low IF signal output is digitally mixed with a divided local oscillator signal to achieve a higher IF which is suited for processing by post-IF components such as a detector. The mixed signal is then filtered by a low dynamic range active filter and limited.

13 Claims, 4 Drawing Sheets

LOW TO HIGHER IF CONVERSION FOR ACTIVE FILTERED LIMITED IF SYSTEMS

BACKGROUND

The present invention relates generally to radio communication systems and, more specifically, to a multiple-conversion receiver where the final intermediate frequency (IF) stage operates at a higher frequency than the previous IF stage.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices. To this end, the design of receivers has received considerable attention.

In a conventional receiver, band pass filters are used to reduce noise and interference. Sometimes, additional filtering may be desired and a dual down conversion superheterodyne receiver may be used. As illustrated in FIG. 1, the dual down conversion superheterodyne receiver 30 receives signals over an antenna 31. The received signal is then filtered in an RF filter 32 and amplified and mixed in a low noise amplifier/mixer 34 with a signal from the first local oscillator 36 to generate a first IF.

The first IF signal is then filtered in the first IF filter 38. In cellular radio applications, for example, the first IF filter 38 is typically a passive crystal filter. In superheterodyne receivers a second IF stage 40 is provided for the second down conversion. Thus, the signal output by the first IF filter 38 is then amplified in an IF filter/mixer 42. The amplified signal is then mixed with a signal from a second local oscillator 44 to mix the signal down to a second IF. The second IF signal is then filtered in a second IF filter 46, typically a passive ceramic filter, and is output to an amplifier 48. This signal is then processed by detector 50 to detect the information symbols within the received signal using techniques that are well known to those skilled in the art.

The design of multiple-conversion superheterodyne receivers has traditionally followed two principles: (1) the conversion should result in progressively lower intermediate frequencies—for example, a 100 MHz signal might be converted to a first IF at 10.7 MHz and then to a second IF at 455 KHz; and (2) the center frequency of the second IF should be as high as possible, commensurate with filter-performance limitations and adjacent-channel suppression requirements, in order to minimize the demand on the first IF filter to suppress mixing products that result from the second conversion and due to manufacturing constraints associated with the materials (e.g. crystal or ceramic) used to construct these filters.

Recent developments have made the second of these principles obsolete, particularly the replacement of passive IF filters by the modern active IF filter. Passive filters used in these conventional receiver structures are considered problematic because, for example, they are expensive and require a large mounting area. Active filtering provides an attractive alternative to this problem. For example, the active filter circuits can be integrated along with other IF circuits, e.g., mixers, voltage controlled oscillators (VCO) and detectors, to create a more compact receiver structure. As described below and mainly to optimize the performance of the active filter and to reduce its cost, it is advantageous to minimize the center frequency of the second IF filter when using an active filter in the second down conversion stage.

In this regard, note that the dynamic range of an active filter is related to the quality factor (Q). As Q increases, the dynamic range goes down (see Gert Groenewold, *The Design of High Dynamic Range Continuous-Time Integratable Bandpass Filters*, IEEE vol. 38, August 1991). In addition, as Q increases the component spread in the filter structure also increases leading to a problem with parasitic capacitance. As the parasitic capacitance increases, the total capacitance used must increase to scale the impedance of the filter resulting in the requirement of more current. At high center frequencies, the parasitic capacitance changes the filter's pole positions and lowers the filter's tolerance to an impractical level. Therefore, the center frequency for the second IF should be low in order to produce a practical filter for integration in silicon.

At the same time, however, a higher second IF is needed for processing by baseband components such as detector 50. There are alternatives available for resolving the tension between the desire to use a lower second IF for active filter design and the need for a higher second IF for baseband processing. One alternative is to redesign the baseband circuits so that they will function at lower IFs. However, redesigning the baseband circuits to operate at lower IFs would be time consuming and expensive. Another alternative is to design a higher IF active filter. However, designing an active filter for higher IF results in higher current and increased silicon area.

Therefore, there exists a need for an apparatus which overcomes the aforedescribed limitations and resolves the need for both lower and higher second IFs in a cost effective manner.

SUMMARY

It is an object of the present invention to overcome the deficiencies described above by providing a simple, cost-effective, up-converter and post-conversion active filter which will enable the continued use of existing baseband devices with multiple-conversion receivers.

According to exemplary embodiments of the present invention, this object is achieved by digitally mixing a low IF signal with a divided local oscillator signal to achieve a higher IF which is suited for processing by baseband components, such as a detector. The mixed signal is then filtered by a low dynamic range active filter. A filter's dynamic range is the range between the noise floor of the filter to the maximum input signal that the filter can handle without creating spurious frequency components. A low dynamic range active filter has a relatively small difference between these two values, such as 40 dB. A high dynamic range active filter, on the other hand, has a greater difference, such as 70 to 80 dB. The low dynamic range active filter will be tuned based on characteristics of the main active filter which provides channel selectivity. After the signal is filtered by the low dynamic range filter, it is again limited to strip off unwanted components and to provide a clean signal.

The oscillator signal operates at a reference frequency which can be adjusted according to the frequency requirement of the baseband component. Alternatively, a divider, such as a programmable counter, can be employed for dividing the reference frequency to suit the baseband component. The digital mixing of the signal output from the high dynamic range filter and the reference signal can be performed using an exclusive-OR gate.

Accordingly, the present invention provides a low IF backend receiver which is compatible with many different detectors. Exemplary implementations use low cost and low current elements to achieve the frequency conversion needed to adapt the signal for baseband processing.

BRIEF DESCRIPTION OF THE DRAWINGS

These and other objects, features and advantages of the present invention will be readily apparent to one skilled in the art from the following written description, read in conjunction with the drawings, in which.

DETAILED DESCRIPTION

Figure 1:
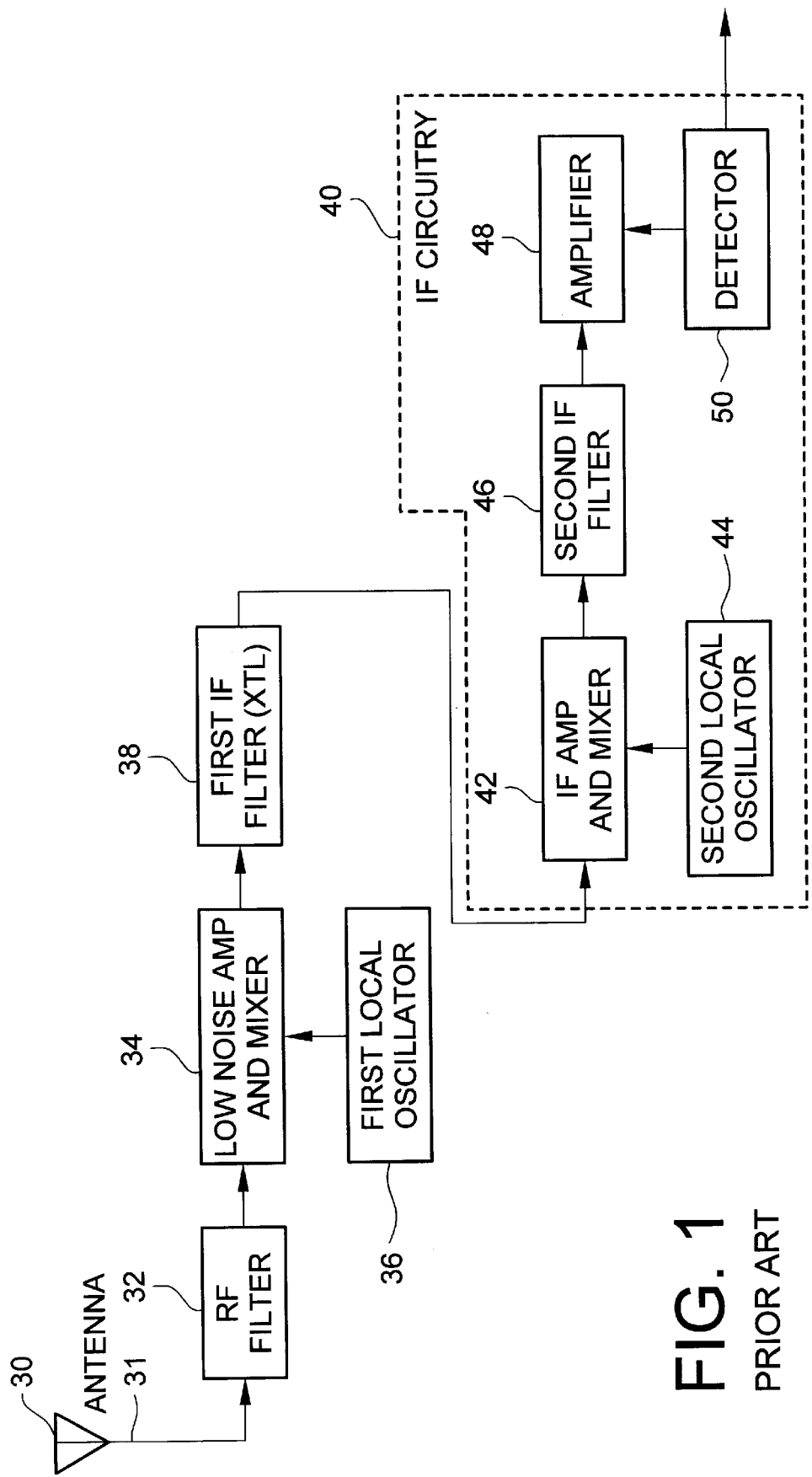
FIG. 1 illustrates a conventional dual down conversion superheterodyne receiver.
Figure 2:
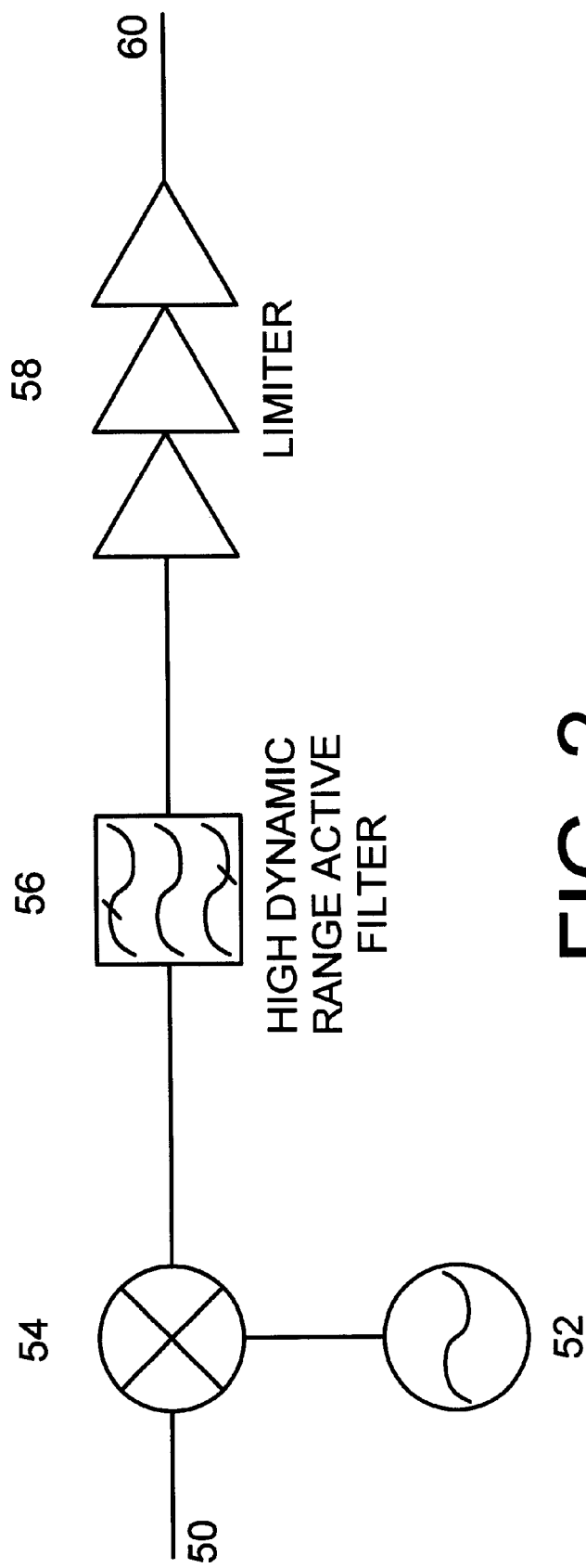
FIG. 2 illustrates a conventional frequency mixer.

In order to promote complete understanding of the present invention, aspects of conventional signal processing will first be described with respect to FIG. 2. FIG. 2 is a schematic block diagram of a conventional system for frequency mixing in the second IF stage of a superheterodyne receiver, e.g., stage 40 in FIG. 1. An input frequency signal 50 is mixed with a local oscillator signal 52 at mixer 54. The input signal 50 is received from the output of a first IF filter of a double conversion receiver, e.g., filter 38 in FIG. 1. The mixed signal is passed through a high dynamic range (e.g., greater than 70 dB) active filter 56 for channel selectivity. The high dynamic range active filter 56 also filters out interference and wideband noise. The signal is then limited by the limiter 58 to obtain the desired channel on signal line 60. This signal is then output to a post-IF processing device, e.g., a detector (not shown).

As mentioned above, it is desirable to have a relatively low second IF (e.g., 50–200 kHz) to ease integration of the high dynamic range filter. However, post-IF components such as a detector typically operate at a higher IF, e.g., 400–800 kHz. For illustrative purposes herein, assume that the low IF is 120 kHz while the higher IF is 480 kHz. Therefore, according to the present invention, the low IF signal is converted to the desired higher IF signal for facilitating processing by post-IF components.

Figure 3:
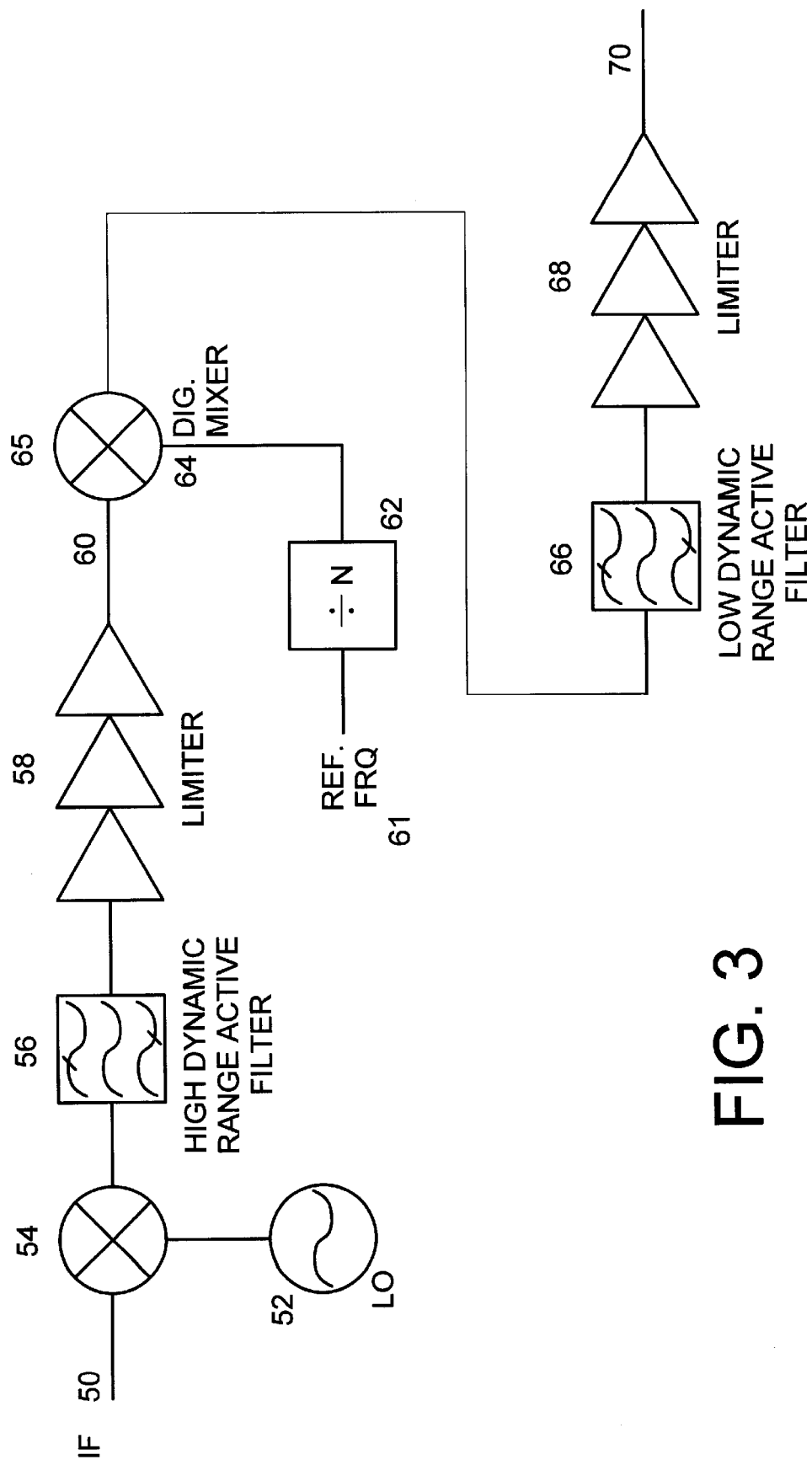
FIG. 3 illustrates a receiver branch according to an exemplary embodiment of the present invention.

FIG. 3 illustrates a receiver branch according to an exemplary embodiment of the present invention wherein the same reference numerals from FIG. 2 are used to identify similar elements in FIG. 3. It will be appreciated that while one of the specific applications of the present invention is to cellular radio receivers, the present invention may be used in any signal receiving apparatus.

With reference to FIG. 3, the limited signal 60 at the second IF is digitally mixed, using a digital mixer 65, with a divided signal 64. The divided signal operates at a frequency that is the difference between the frequency of post-IF components and the frequency of the limited signal 60. In other words, the sum of frequency of the limited signal 60 and the frequency of the divided signal 64 is the desired frequency of the post-IF components.

Since the high dynamic filter has eliminated any unwanted signals and the limiter has stripped away all amplitude components, the dynamic range of the signal after the limiter is very low. Thus, all of the components after the first limiter have minimal dynamic range requirements.

In obtaining a divided signal 64, various methods may be used. For example, the reference frequency 61 can be adjusted to obtain the desired divided signal 64 in which case the value by which divider 62 adjusts the reference frequency is constant. Alternatively, the divider 62 can be programmable to allow adjustment of the value of the dividing circuit to obtain the desired frequency for divided signal 64. For the example given above where the second IF is 120 kHz and the desired, higher IF is 480 kHz, the divided signal operates at 360 kHz.

The mixed signal is passed through a low dynamic range active filter 66 and a second limiter 68. This filter 66 rejects the unwanted mixing products which are produced by mixer 65. With adequate attenuation of the undesired signals, the desired signals are totally captured by the second limiter 68. The noise present in the low dynamic range filter is below the noise produced by the second limiter. The input to the low dynamic range filter 66 will be a constant amplitude square wave. The filter 66 can provide a linear filtering function of the input signal.

The limiter 68 strips off the peak values of a sinusoidal input wave to produce a square wave. The limiter 68 further removes the amplitude noise from the signal and provides a clean signal 70 for output to the post-IF components that operate at higher IFs. In some post-IF components, a limiter is built-in; in this case, the second limiter 70 can be removed.

Figure 4A:
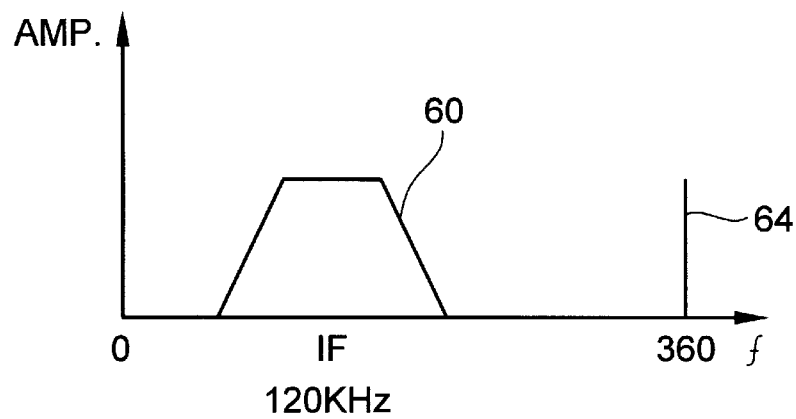
FIGS. 4(a) and 4(b) illustrate exemplary frequency domain inputs and outputs, respectively, of the circuit of FIG. 3.
Figure 4B:
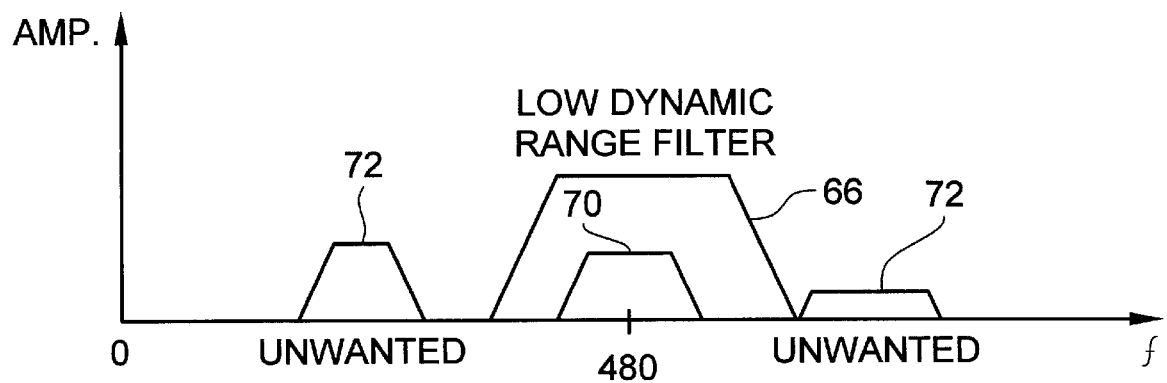

Exemplary input 60 and output 70 signals according to the present invention for an exemplary application are illustrated in FIGS. 4(a) and 4(b), respectively.

FIG. 4(a) illustrates an IF signal 60 being input to the digital mixer 65. For the illustrative example stated above, the IF signal 60 has the illustrated spectral shape centered at 120 kHz. The divided frequency signal 64 operates at 360 kHz and is also input to mixer 65.

FIG. 4(b) illustrates the output of digital mixer 65. As seen in FIG. 4(b), the output of mixer 65 includes the desired signal 70 as well as unwanted products 72 created by the multiplication of signals 60 and 64 in mixer 65. Thus, low dynamic range filter 66 has the filter characteristic illustrated in FIG. 4(b) so as to pass component 70 and filter out unwanted components 72.

The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being fully commiserate in scope with the following claims.

What is claimed is:

1. A receiver comprising:

an intermediate frequency (IF) input signal operating at a first frequency;

a local oscillator signal, derived from a synthesizer of a receiver, and operating at a second frequency;

a frequency mixer for mixing the input signal and the local oscillator signal to produce a first mixed signal operating at a third frequency;

a high dynamic range active filter for filtering out interference and wideband noise from the first mixed signal;

a limiter for limiting the filtered signal from said filter and outputting a first limiter signal;

a digital mixer for mixing said first limiter signal with a divided signal, from a synthesizer of a receiver, operating at a fourth frequency to produce a second mixed signal operating at a fifth frequency;

a low dynamic range active filter for filtering out unwanted portions of the second mixed signal and producing a second filtered signal; and a second limiter for removing amplitude noise from the second filtered signal and outputting a second limiter signal, operating at a frequency higher than the frequency of the input signal, for processing by a post-IF component.

2. The receiver of claim 1 wherein the third frequency is the sum of the first frequency and the second frequency.

3. The receiver of claim 1 wherein the first mixed signal operates at 120 kHz.

4. The receiver of claim 1 wherein the fifth frequency is the sum of the third frequency and the fourth frequency.

5. The receiver of claim 1 wherein the digital mixer is an exclusive or (XOR) gate.

6. The receiver of claim 1 wherein the divided signal operates at 360 kHz.

7. The receiver of claim 1 wherein the second mixed signal is a constant amplitude square wave.

8. A method for preparing a received signal for demodulation, said method comprising the steps of:

mixing an intermediate frequency (IF) input signal and a local oscillator signal to produce a first mixed IF signal;

passing the first mixed IF signal through a first active filter for filtering out interference and wideband noise and producing a first filtered IF signal;

limiting the filtered first IF signal through a first limiter and outputting a first limiter IF signal; and converting said first limiter IF signal to a frequency that is higher than the frequency of the IF input signal, said conversion further comprising:

mixing, via a digital mixer, the first limiter signal with a divided signal from the local oscillator to produce a second mixed signal;

filtering unwanted portions of the second mixed signal using a low dynamic range active filter to produce a second filtered signal; and removing amplitude noise from the second filtered signal using a second limiter to produce an output signal for processing by a post-IF component wherein the second mixed signal is a constant amplitude square wave.

9. The method according to claim 8 wherein the first mixed signal operates at 120 kHz.

10. The method of claim 8 wherein the converted signal operates at 480 kHz.

11. The method of claim 8 wherein the second digital mixer is an exclusive or (XOR) gate.

12. The method of claim 8 wherein the divided signal operates at 360 kHz.

13. The method of receiver of claim 8 wherein the low dynamic range is 40 dB.

* * * * *